US012340524B2

(12) United States Patent
Janjic

(10) Patent No.: US 12,340,524 B2
(45) Date of Patent: Jun. 24, 2025

(54) DIGITAL VIDEO COMPUTING SYSTEM FOR VEHICLE

(71) Applicant: Aurora Flight Sciences Corporation, Manassas, VA (US)

(72) Inventor: Igor Janjic, Newport News, VA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 584 days.

(21) Appl. No.: 17/658,369

(22) Filed: Apr. 7, 2022

(65) Prior Publication Data

US 2022/0383515 A1 Dec. 1, 2022

Related U.S. Application Data

(60) Provisional application No. 63/202,144, filed on May 28, 2021.

(51) Int. Cl.
*G06T 7/73* (2017.01)
*G06T 7/246* (2017.01)
*G06T 7/269* (2017.01)

(52) U.S. Cl.
CPC .............. *G06T 7/248* (2017.01); *G06T 7/269* (2017.01); *G06T 7/73* (2017.01); *G06T 2207/10021* (2013.01); *G06T 2207/30252* (2013.01)

(58) Field of Classification Search
CPC .......... G06T 7/248; G06T 7/269; G06T 7/73; G06T 2207/10021; G06T 2207/30252;
(Continued)

(56) References Cited

U.S. PATENT DOCUMENTS 10,650,235 B2 * 5/2020 Zhou ..................... H04N 5/33
10,657,409 B2 * 5/2020 Piekniewski .......... G01B 11/14
(Continued)

OTHER PUBLICATIONS

Y. Zhou and S. Maskell, "Moving object detection using background subtraction for a moving camera with pronounced parallax," 2017 Sensor Data Fusion: Trends, Solutions, Applications (SDF), Bonn, Germany, 2017, pp. 1-6, doi: 10.1109/SDF.2017.8126361. (Year: 2017).*

(Continued)

*Primary Examiner* — Hadi Akhavannik
*Assistant Examiner* — Dion J Satcher
(74) *Attorney, Agent, or Firm* — Alleman Hall & Tuttle LLP

(57) ABSTRACT

A digital video computing system receives two or more frames depicting an environment from a camera system of a vehicle. For a salient image feature identified in the two or more frames, a global motion vector is calculated that is indicative of movement of the feature at least partially attributable to movement of the vehicle. A local motion vector is calculated that is indicative of movement of the feature independent from the movement of the vehicle. Based on the local motion vector, the salient image feature is determined to have an apparent motion relative to the environment that is independent from the movement of the vehicle. A candidate image patch is identified including the salient image feature. The candidate image patch is analyzed to output a likelihood that the candidate image patch depicts a second vehicle.

20 Claims, 10 Drawing Sheets

(58) Field of Classification Search
CPC .......... G06T 7/277; G06T 2207/10032; G06T 7/593; G06T 2207/20021; G06T 2207/20076; G06T 2207/20084; G06T 7/246

See application file for complete search history.

(56) References Cited

U.S. PATENT DOCUMENTS

| | | | | |
|---|---|---|---|---|
| 2012/0250105 | A1* | 10/2012 | Lukac | G06V 30/162 |
| | | | | 358/464 |
| 2015/0055821 | A1* | 2/2015 | Fotland | G06V 10/255 |
| | | | | 382/103 |
| 2018/0075593 | A1* | 3/2018 | Wang | G06V 40/103 |
| 2019/0057521 | A1* | 2/2019 | Teixeira | A61B 6/545 |
| 2020/0065981 | A1* | 2/2020 | Akashi | G06T 7/194 |
| 2020/0073385 | A1* | 3/2020 | Jobanputra | B64D 47/08 |
| 2022/0011240 | A1* | 1/2022 | Schwarz | B23K 26/38 |

OTHER PUBLICATIONS

Li, Jing. Fast and Robust UAV to UAV Detection and Tracking Algorithm. Diss. Purdue University, 2019. (Year: 2019).*

Li, J., "Fast and Robust UAV to UAV Detection and Tracking Algorithm," Doctor of Philosophy Dissertation, Purdue University, May 2019, 84 pages.

* cited by examiner

DIGITAL VIDEO COMPUTING SYSTEM FOR VEHICLE

CROSS REFERENCE TO RELATED APPLICATIONS

This application claims priority to U.S. Provisional Patent Application Ser. No. 63/202,144, filed May 28, 2021, the entirety of which is hereby incorporated herein by reference for all purposes.

FIELD

The disclosure relates generally to techniques for processing digital video captured by a camera system of a vehicle, particularly to detect other vehicles in an environment.

BACKGROUND

It is generally desirable for a vehicle equipped with an onboard camera to detect and track the movements of other vehicles. For instance, the camera may capture one or more images of a surrounding environment (e.g., as individual frames of a digital video). Such images may then be processed by a computing system to attempt to detect another vehicle within the images—e.g., by detecting one or more image features within the images that are consistent with the appearance of another vehicle. After determining that a particular set of detected image features likely corresponds to a vehicle, the computing system may estimate the three-dimensional position of the vehicle within the environment, and track movements of the vehicle as subsequent images are captured.

However, image-based vehicle tracking may be resource intensive and prone to false positives. In the case of aerial vehicles such as airplanes or drones, any particular image captured of the vehicle's environment can include any number of objects or visual artifacts that can be incorrectly recognized as another vehicle by the computing system. As examples, weather features such as clouds, wildlife such as birds, natural terrain such as trees or distant mountains, or ground-based structures such as buildings or towers can all contribute to false positive detections. Furthermore, processing of the video stream to detect and continuously track the position of a moving vehicle typically requires a significant expenditure of computational power by the computing system. Both of these factors can contribute to inconsistent performance in vehicle tracking.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

To address at least the above issues, according to one aspect of the present disclosure, a digital video computing system receives two or more frames depicting an environment from a camera system of a vehicle. A salient image feature is identified in the two or more frames. A global motion vector is calculated that is indicative of movement of the salient image feature between the two or more frames that is at least partially attributable to a movement of the vehicle between capture of each frame of the two or more frames. A local motion vector is calculated that is indicative of movement of the salient image feature between the two or more frames that is independent from the movement of the vehicle between capture of each frame of the two or more frames. The salient image feature is determined to have an apparent motion relative to the environment that is independent from the movement of the vehicle between capture of each frame of the two or more frames, based at least on the local motion vector for the salient image feature. A candidate image patch is identified within the two or more frames, the candidate image patch including the salient image feature. The candidate image patch is analyzed to output a likelihood that the candidate image patch depicts a second vehicle moving through the environment.

The features, functions, and advantages that have been discussed can be achieved independently in various embodiments or can be combined in yet other embodiments, further details of which can be seen with reference to the following description and drawings.

DETAILED DESCRIPTION

Figure 1:
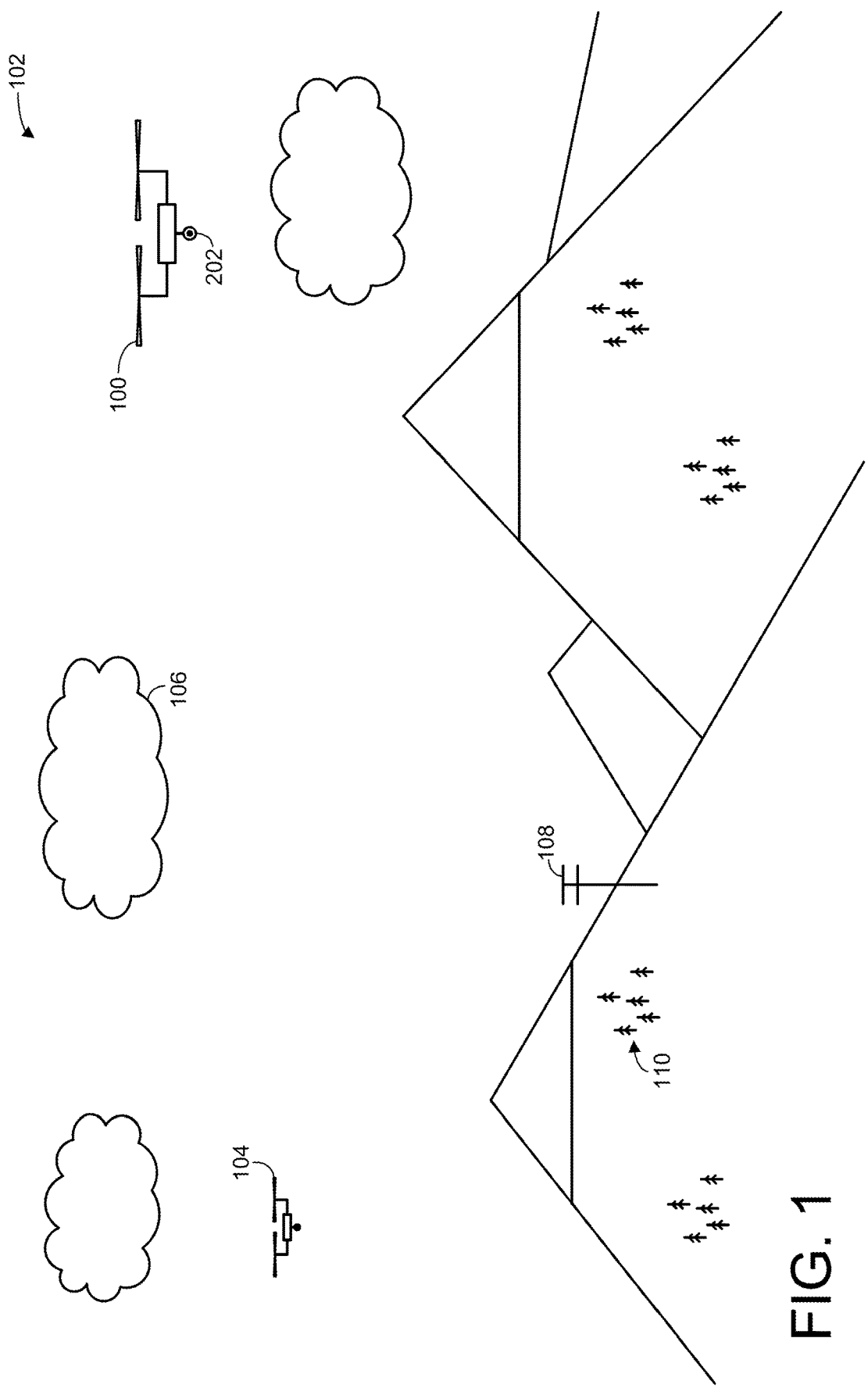
FIG. 1 schematically illustrates an example scenario in which a vehicle is tracking a second vehicle within an environment in accordance with an embodiment of the present disclosure.

FIG. 1 schematically shows an example vehicle 100 moving through an outdoor environment 102. While the environment 102 is an outdoor environment in the illustrated example, other environments are contemplated. In this example, the vehicle 100 is an unmanned aerial vehicle (UAV), also referred to as a "drone." It will be understood that the techniques described herein may be applied to any suitable type of vehicle regardless of whether the vehicle is locally-piloted, remotely-piloted, or autonomously piloted.

As nonlimiting examples, vehicles can include unmanned and/or piloted ground-based vehicles, such as cars, trucks, carts, motorcycles, or robots; unmanned and/or piloted aircraft, such as airplanes or helicopters; unmanned and/or piloted watercraft, such as boats, ships, or barges; and unmanned and/or piloted spacecraft such as satellites, orbital vehicles, or deep space vehicles.

FIG. 1 also schematically shows a second vehicle 104, which is also moving through environment 102. As will be described in more detail below, vehicle 100 includes a camera system 202 configured to capture a digital video of the environment 102. The vehicle 100 uses a local or remote computing system configured to process the video captured by the camera system 202 and detect presence of second vehicle 104 in frames of the digital video. In this manner, vehicle 100 may first detect and then continuously track movements of second vehicle 104 through environment 102.

In existing systems, inconsistencies (e.g., misidentified artifacts) in the video can result in mischaracterization of the second vehicle 104. In the example of FIG. 1, environment 102 also includes a cloud 106, ground-based structure 108, and trees 110, any or all of which can contribute to false positive detections by existing systems. Solutions herein provide a technical advantage in that the solutions take these and other factors into account. In particular, a technical effect of embodiments herein includes reduced resource usage (e.g., CPU, GPU, battery) by reducing computation needed to identify movement of a second vehicle 104. Another technical effect of embodiments herein includes increased robustness against false positive detections by better differentiating objects that are moving independently within the environment from generalized global motion.

Figure 2:
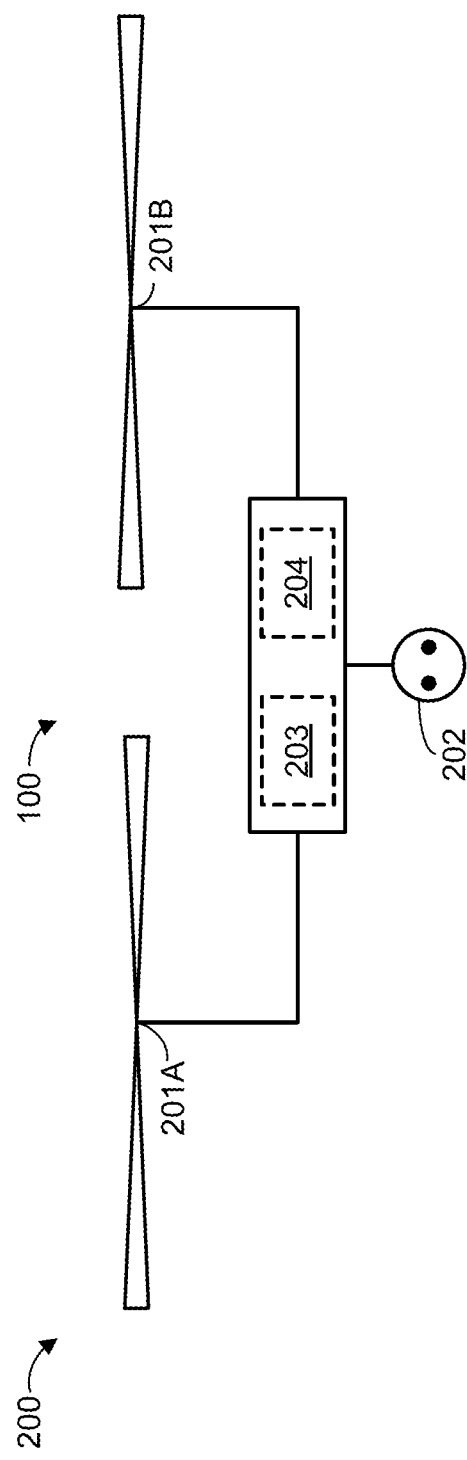
FIG. 2 schematically depicts an example vehicle in accordance with an embodiment of the present disclosure.

FIG. 2 schematically depicts vehicle 100 in more detail. As shown, vehicle 100 includes a propulsion system 200 configured to move the vehicle 100 through the environment 102. In this example, the propulsion system 200 includes a pair of rotors 201A and 201B coupled with a suitable source of mechanical power—e.g., an engine or motor (not shown). By controlling activity of the propulsion system 200, a local or remote operator (e.g., human, autonomous system, or a combination thereof) may control movements of the vehicle 100 through the environment 102. The vehicle 100 may in some cases be self-navigating, moving in response to commands provided by an onboard computing system 203. Additionally, or alternatively, the vehicle 100 may move in response to remote control inputs received over a suitable communications interface, such as a radio receiver.

It will be understood that propulsion system 200 is a non-limiting example. The techniques described herein can be applied to any suitable type of vehicle, having any suitable type of propulsion system.

As non-limiting examples, other suitable propulsion systems may include other air-based propulsion systems (e.g., a jet engine including a propulsive nozzle), ground-based propulsion systems (e.g., an engine coupled with wheels or tracks); water-based propulsion systems (e.g., an engine coupled with a propeller or impeller); and space-based propulsion systems (e.g., chemical thrusters, ion thrusters). Vehicles may use any suitable power source, including battery power, chemical fuels, photovoltaic power, nuclear/steam power, etc.

Vehicle 100 also includes a camera system 202. As will be described in more detail below, the camera system 202 is configured to capture two or more frames of a digital video depicting the environment 102 as the vehicle 100 moves through the environment 102. The digital video comprises a plurality of sequential video frames captured by the camera system 202 during a series of time frames. For the purposes of this disclosure, a "time frame" refers to a window of time in which each of one or more imagers of the camera system 202 captures a video frame depicting the environment 102. Thus, when the digital video has a frame rate of sixty frames-per-second (FPS), then sixty-time frames will occur each second. Any suitable frame rate may be used.

In some cases, the camera system 202 may be a stereoscopic camera system. For example, the camera system may include at least a first (e.g., right) imager and a second (e.g., left) imager, each configured to capture separate video frames of the environment on each time frame. In some cases, the stereoscopic camera system 202 may be configured to calculate a disparity map between video frames output by the two or more different imagers, indicating differences between the two video frames caused by the physical separation of the two imagers. For example, any objects that are relatively closer to the camera system will exhibit a greater change in apparent position between the video frames captured by the two or more imagers, as compared to objects that are relatively farther from the camera system due to the parallax effect.

In some examples, the camera system 202 may be configured to output, on each time frame, a video frame and a corresponding disparity image frame, where the disparity frame indicates differences between the video frame and a corresponding frame captured by a different imager of the camera system. Such use of stereoscopic image pairs can be used to triangulate the position of an imaged object (such as a second vehicle) relative to the camera system 202, as will be described in more detail below.

The camera system 202 may take any suitable form. It will be understood that camera system 202 includes at least one imager configured to capture two or more frames depicting environment 102. The camera system 202 may include any suitable number of imagers, and each imager may capture images having any suitable resolution and with any suitable framerate.

Images output by each imager may be color images or greyscale images, and in some cases, one or more imagers of the camera system 202 may be sensitive to non-visible wavelengths of electromagnetic radiation (e.g., infrared light, near infrared light, ultraviolet light, and/or radio waves). Furthermore, the camera system 202 may be calibrated in any suitable way, using any suitable gain, exposure, and white balance settings. In some cases, a computing system configured to process images captured by the camera system may store data corresponding to intrinsic and extrinsic parameters of the camera system 202. This may enable the computing system to correct for lens distortion and other optical effects at each individual imager, and to calculate three-dimensional positions of objects or features depicted in images captured by the camera system 202.

As shown in FIG. 2, vehicle 100 also includes an on-board digital video computing system 204. The digital video computing system 204 is configured to implement any or all of the image processing and vehicle detection techniques described herein. The digital video computing system 204 may have any suitable capabilities and hardware configuration. In some cases, digital video computing system 204 may be implemented as computing system 1000 described below with respect to FIG. 10.

In some implementations, one or more aspects of a digital video computing system 204 may be off-loaded to a remote computing system. For example, image frames may be locally captured by camera system 202 and communicated to a remote computing system for off-board processing. All descriptions of image processing herein are equally applicable to on-board, off-board, or hybrid (i.e., partially on-board, partially off-board) processing.

The digital video computing system 204 is configured to receive frames of a digital video captured by camera system 202. In this manner, the digital video computing system 204 is configured to detect other vehicles present in environment 102, such as second vehicle 104.

Figure 3:
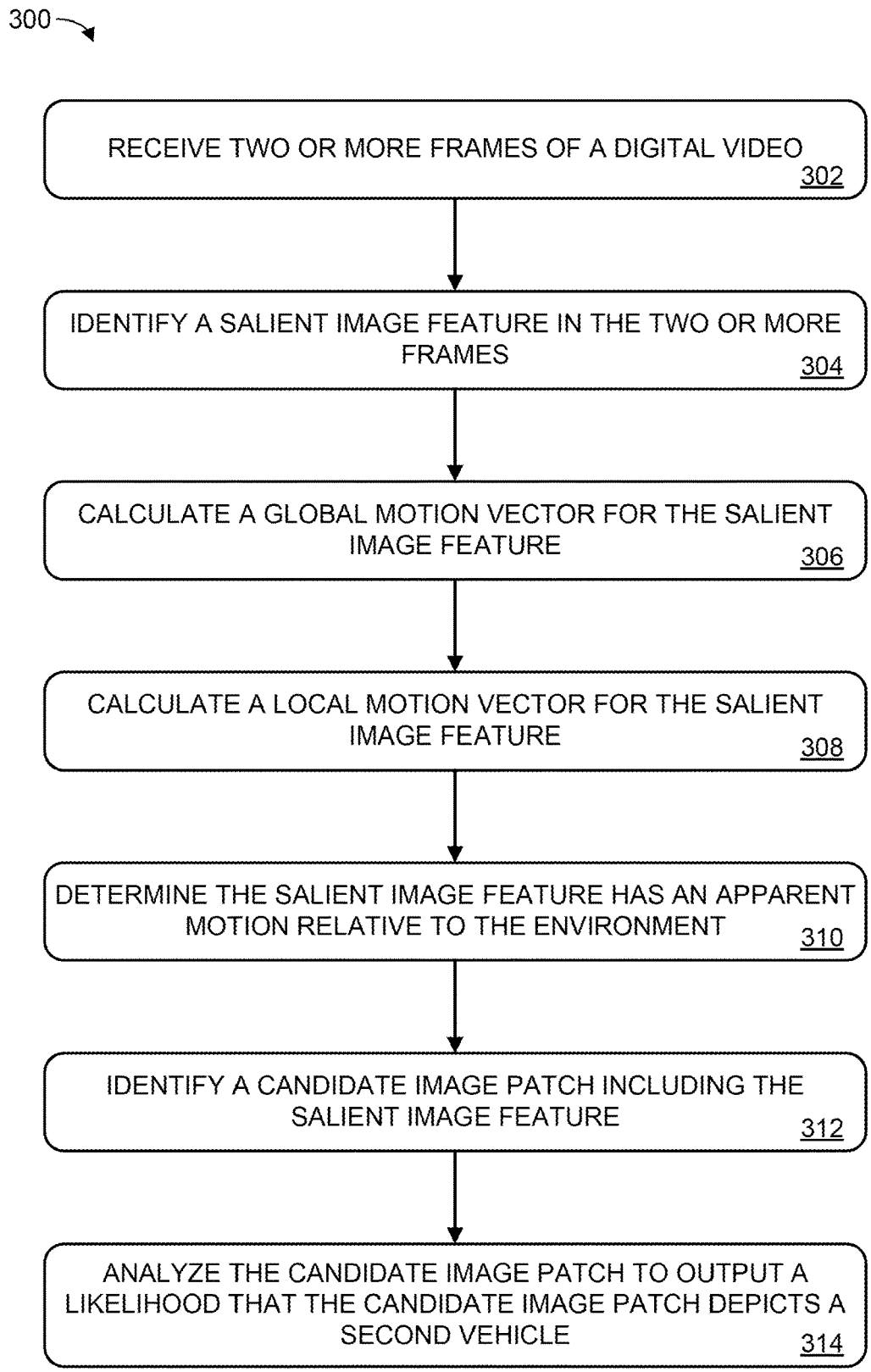
FIG. 3 illustrates an example method for detecting a vehicle within frames of a digital video in accordance with an embodiment of the present disclosure.

FIG. 3 illustrates an example method 300 for detecting a vehicle within 104 frames of a digital video. Method 300 may be implemented by any suitable computing system of one or more computing devices. In some examples, one or more steps of method 300 are implemented by digital video computing system 204 of FIG. 2, and/or one or more steps of method 300 may be implemented by a remote computing system communicatively coupled with vehicle 100. In some examples, method 300 may be implemented by computing system 1000 described below with respect to FIG. 10.

At 302, method 300 includes receiving two or more frames of a digital video from a camera system 202 of a vehicle 100. For example, digital video computing system 202 of vehicle 100 receives digital video frames from camera system 202 as vehicle 100 moves through environment 102.

Figure 4:
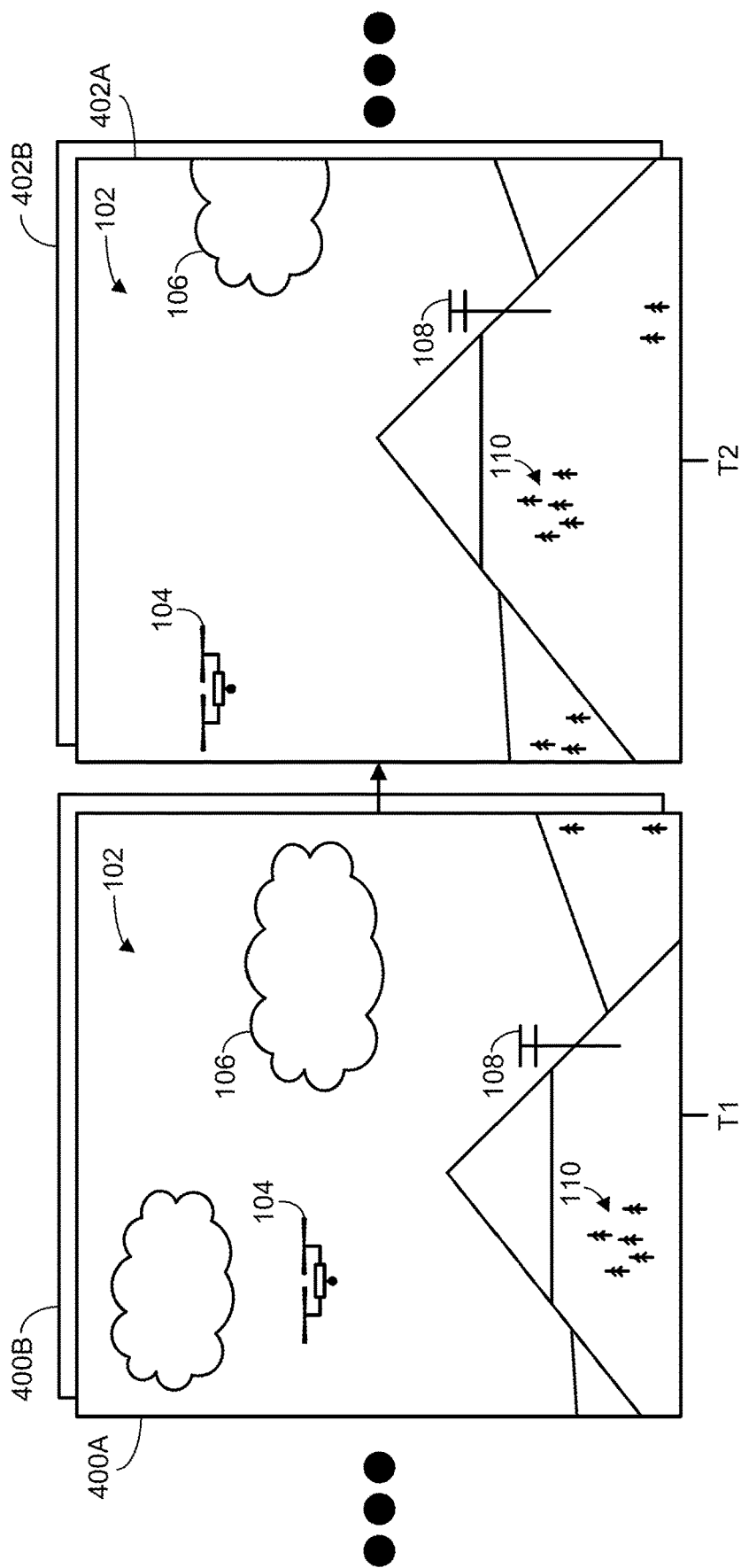
FIG. 4 schematically shows two example frames of a digital video captured by a camera system of a vehicle in accordance with an embodiment of the present disclosure.

Turning briefly to FIG. 4, a schematic representation of two frames, a first frame 400A and a second frame 402A, each depicting environment 102 is shown. Frame 400A is captured on a first-time frame T1, while frame 402A is captured on a second time frame T2. Frames 400A and 402A may be consecutive frames of a digital video, in that no intermediary frames were captured between frames 400A and 402A. In other examples, however, the two or more frames 400A, 402A of digital video received by the digital video computing system need not be consecutive frames, but rather may be separated in time by one or more intermediary frames. Furthermore, it will be understood that frame 400A may be preceded by any number of frames captured during earlier time frames, and frame 402A may be succeeded by any number of frames captured during later time frames.

The techniques described herein are primarily illustrated with respect to frames 400A and 402A. Frames 400A and 402A are video frames captured by a same imager of camera system 202 at different times. However, as discussed above, the camera system 202 may in some cases be a stereoscopic camera system having two or more separate imagers. Thus, on each time frame, the camera system 202 may output two or more separate frames captured by two or more separate imagers, or the camera system 202 may output a single video frame on each time frame that is a composite of two or more different frames captured by two or more different imagers.

In some examples, two or more different imagers of camera system 202 may capture images at different framerates. Thus, the camera system 202 may output different numbers of image frames on each time frame, depending on which imagers captured new image frames on that time frame.

In the example of FIG. 4, two different frames are output on each time frame, including frames 400A and 400B each captured on time frame T1, and frames 402A and 402B each captured on time frame T2. Frames 400A and 400B may be separate images captured by separate imagers of camera system 202. Alternatively, frame 400B may be a disparity image frame that indicates differences between frame 400A and a corresponding video frame captured by a different imager of the camera system 202—e.g., frame 400A may be captured by a right imager, while frame 400B indicates differences between frame 400A and a different frame captured at the same time as frame 400A by a left imager. In such cases, receiving the two or more frames of the digital video at the digital video computing system 204 may include receiving, for each frame, a video frame and a corresponding disparity image frame.

Frames 400A and 402A each depict outdoor environment 102 from the perspective of a single imager of camera system 202, where camera system 202 may include multiple imagers. Within each frame, second vehicle 104, cloud 106, ground-based structure 108, and trees 110 are all visible. Notably, frames 400A and 402A are captured at different times, and vehicle 100 moved within the environment between capture of frame 400A and 402A. Due to this, the image-space positions of ground-based structure 108 and trees 110 have changed in frame 402A as compared to frame 400A. Specifically, the vehicle 100 has decreased its elevation and translated to the left, resulting in an apparent upward and rightward motion of the static objects in the environment (including ground-based structure 108, trees 110, as well as other static terrain features). For the purposes of this disclosure, an "image-space position" refers to the set of two-dimensional pixel coordinates within an image at which a particular object or feature is depicted. As will be described in more detail below, the image-space movements of objects between capture of frames 400A and 402A are used to detect the presence of second vehicle 104 more accurately in the video frames.

It will be understood that the differences between frames 400A and 402A are deliberately exaggerated for the sake of illustration. In particular, the image-space movements of second vehicle 104, cloud 106, ground-based structure 108, and trees 110 depicted in FIG. 4 may have a greater magnitude than would ordinarily be observed. In other words, in practical examples, the differences between any two consecutive frames of a digital video may be more minor than the differences between frames 400A and 402A.

Returning to FIG. 3, method 300 includes, at 304, identifying a salient image feature in the two or more frames of the digital video. In some examples, a plurality of salient image features may be detected. The salient image features may take any suitable form and may be identified in any suitable way. In general, a "salient image feature" includes a set of one or more neighboring image pixels having distinct properties enabling detection of such features within an image. This is schematically illustrated with respect to FIG. 5, again showing frames 400A and 402A of a digital video captured by camera system 202.

Figure 5:
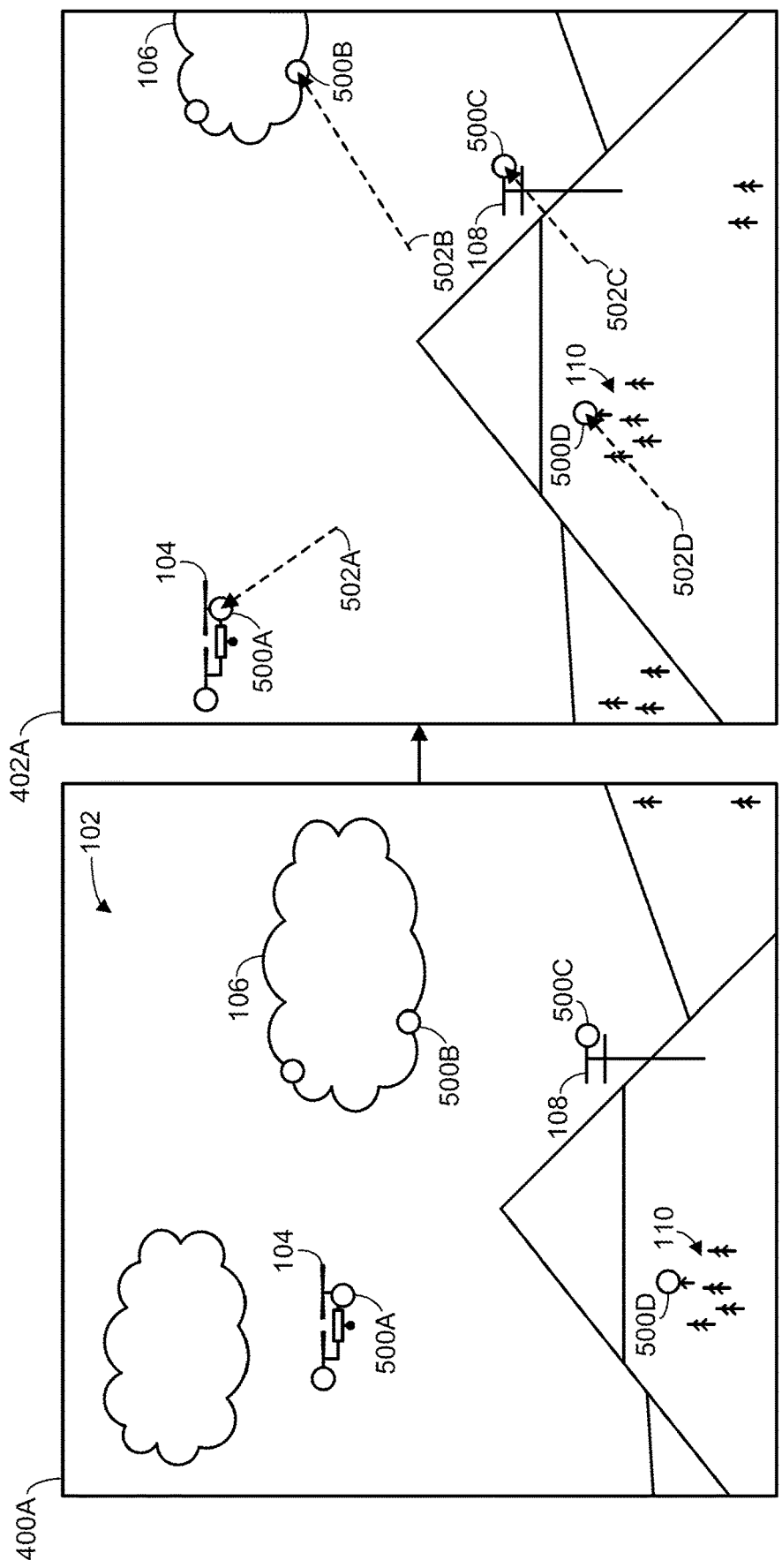
FIG. 5 schematically illustrates calculation of a global motion vector for a salient image feature identified in a frame of a digital video in accordance with an embodiment of the present disclosure.

In FIG. 5, a plurality of salient image features 500 has been identified within the two frames 400A, 402A. The image-space positions of the salient image features 500 are schematically represented by white circles. Frame 400A shows four specific salient image features. Image feature 500A corresponds to a portion of second vehicle 104, image feature 500B corresponds to a portion of cloud 106, image feature 500C corresponds to a portion of ground-based structure 500C, and image feature 500D corresponds to a portion of a tree 110.

Depending on the implementation, different feature extraction algorithms may be used to identify salient image features having different desired properties. For example, salient image features may include sets of pixels that appear to depict edges or corners present in an image. Such features may be detected using, as non-limiting examples, Harris corner detection, Shi Tomasi corner detection, Features from Accelerated Segment Test (FAST) feature detection, Binary Robust Independent Elementary Features (BRIEF) feature detection, Oriented FAST and Rotated BRIEF (ORB) feature detection, Scale Invariant Feature Transform (SIFT) feature detection, and Speeded Up Robust Features (SURF) feature detection.

In some cases, salient image features 500 may be identified in every frame of the digital video captured by the camera system 202. In other examples the digital video computing system 204 may identify salient image features 500 in less than every frame of the digital video—for example, every other frame.

Returning briefly to FIG. 3, at 306, method 300 includes calculating a global motion vector for the salient image feature 500. The global motion vector is indicative of movement of the salient image feature 500 between the two or more frames that is at least partially attributable to movement of the vehicle 100 between capture of each frame of the two or more frames. Specifically, the global motion vector is indicative of changes in the image-space pixel coordinates at which the salient image feature 500 is detected in one frame as compared to a preceding frame. In some cases, a plurality of global motion vectors may be calculated for a plurality of salient image features 500.

This is also schematically illustrated with respect to FIG. 5. In FIG. 5, each of the plurality of salient features 500A-D described above with respect to frame 400A are again detected within frame 402A, but at different image-space positions. FIG. 5 also depicts four global motion vectors 502A, 502B, 502C, and 502D, corresponding respectively to the image features 500A, 500B, 500C, and 500D. In this example, each of the global motion vectors 502 begins at the image-space position at which its corresponding salient image feature 500 was detected within frame 400A, and terminates at the image-space position at which its corresponding image feature 500 was detected within frame 402A. As such, the direction and magnitude of each global motion vector 502 indicates the direction and magnitude of the change in image-space position of each corresponding salient image feature 500.

Global motion vectors 502 may be calculated in any suitable way. In some examples, calculating the global motion vector 502 for a salient image feature 500 includes calculating an optical flow of the salient image feature 500 between the two or more frames 400A, 402A of the digital video. Any suitable optical flow algorithms may be used. The digital video computing system 204 may independently identify a plurality of salient image features 500 in each frame. From there, the digital video computing system 204 may attempt to identify correspondences between image features 500 detected in one frame (e.g., frame 402A), and features 500 detected in a preceding frame (e.g., frame 400A), to attempt to determine which feature pairs depict the same objects within the environment 102. A global motion vector 502 may then be calculated for each salient image feature 500 in the succeeding frame 402A that is determined to have a counterpart salient image feature 500 in the preceding frame 400A.

As discussed above, the global motion vector 502 for each salient image feature 500 is indicative of movement of the salient image feature 500 that is at least partially attributable to the movement of the vehicle 100 between capture of the two or more frames 400A, 402A. As shown in FIG. 5, image features 500C and 500D are associated with objects in the environment that remained substantially static between capture of frames 400A and 402A. In this simplified example, vectors 502C and 502D have substantially the same direction and magnitude. Thus, vectors 502C and 502D are representative of a generalized global motion between frames 400A and 402A, associated with the motion of the vehicle.

It will be understood that, while six image features 500 are shown in FIG. 5, this is a non-limiting example. In practical scenarios, any number of different salient image features may be identified in any particular frame of a digital video. Furthermore, in FIG. 5, image features 500C and 500D are the only features 500 representative of the generalized global motion caused by movement of the vehicle 100. However, in practical scenarios, the digital video computing system 204 may identify any number of different salient image features 500 corresponding to static terrain features—e.g., ground-based structure 108, trees 110, and other objects depicted in frames 400A and 402A that remain substantially stationary relative to the environment 102. Furthermore, in general, identifying more salient image features 500 that correspond to objects that remained substantially stationary can improve the accuracy of a determined generalized global motion.

It will be understood that, in practical examples, different objects in the environment 102 that each remained static during movement of the vehicle 100 need not have identical image-space movements from one frame to another. For example, static objects that are relatively further away from the position of the camera system 202 may appear to have less image-space movement than static objects that are relatively closer to the camera system 202, although the direction of the apparent motion of such objects may still be substantially similar. In some examples, a disparity image, and/or other suitable depth-finding techniques, may be used to account for differential image-space movement of static objects by inferring information regarding the relative distances of such objects away from the camera system 202. In any case, a generalized global motion is inferred based at least on calculating global motion vectors 502 for salient image features 500 detected in two or more frames 400A, 402A, provided that at least some image features 500 are identified that correspond to unmoving objects. This may cause different regions of the image to include image features 500 that have substantially homogeneous image-space movement from one frame to another, indicative of the movement of vehicle 100 between capture of consecutive images.

In some examples, determining the generalized global motion between two frames 400A, 402A of a digital video may include calculating a homography matrix between the two frames 400A, 402A. In other words, the two or more frames 400A, 402A of the digital video received by the digital video computing system may include at least a first frame (e.g., frame 400A) and a second frame (e.g., frame 402A), consecutive to the first frame. The digital video computing system 204 may then calculate a homography matrix between the first frame 400A and the second frame 402A.

A homography matrix is a mapping of correspondences between points on two different image planes, where the points may include salient image features 500 identified in two different frames 400A, 402A of a digital video, as described above. Put another way, a homography matrix can be described as a transformation that could be applied to a set of points in a first image 400A to reconcile their positions with a corresponding set of points in a second image 402A, in an attempt to account for an unknown change in camera perspective between capture of the two images 400A, 402A.

A homography matrix may be calculated in any suitable way. In some examples, calculating a homography matrix may include applying a perspective transformation warp in conjunction with an iterative random sample consensus (RANSAC) approach that identifies a plurality of salient image features 500 consistent with a particular candidate transformation. This may be beneficial, as it is likely that at least some salient image features 500 in the two or more frames 400A, 402A will exhibit image-space movement that is independent of the generalized global motion associated with movement of the vehicle 100, and thus will be identified as outliers during the RANSAC analysis.

In contrast to salient image features 500C and 500D, the image-space movements of salient image features 500A and 500B differ from one another, and from the image-space movements of features 500C and 500D. Rather, the directions and magnitudes of global motion vectors 502A and 502B differ from those of vectors 502C and 502D. In such cases, where the image-space movements of some salient image features 500 differ from an apparent generalized global motion in the image, it may be an indication that the image features 500 associated with heterogeneous image-space movements correspond to objects in the environment 102 that moved independently from the vehicle 100. This is the case in FIG. 5, as second vehicle 104 and cloud 106 each moved independently from vehicle 100 between capture of frames 400A and 402A.

Returning briefly to FIG. 3, at 308, method 300 includes calculating a local motion vector for the salient image feature 500. The local motion vector calculated for the salient image feature 500 is indicative of movement of the salient image feature 500 between the two or more frames 400A, 402A that is independent from the movement of the vehicle 100 between capture of each frame of the two or more frames 400A, 402A. In other words, a local motion vector calculated for a salient image feature 500 is a representation of an apparent motion of a corresponding object through the environment 102 that is not attributable to movement of the vehicle 100. In cases where multiple salient image features are detected, local motion vectors may be calculated for any or all of the salient image features.

In some examples, the digital video computing system 204 calculates a generalized global motion vector indicative of image-space movement between two frames 400A, 402A that is attributable to the changing perspective of the camera system 202 caused by movement of the vehicle 100. A local motion vector is then calculated by subtracting such a generalized global motion vector from the observed image-space movement of any given salient image feature 500. In other words, a local motion vector corresponds to image-space movement of an image feature 500 that differs from the generalized global motion, and may indicate that an object corresponding to the image feature 500 is moving relative to the environment 102. However, it will be understood that a local motion vector need not always indicate an actual motion of a corresponding object through the environment 102, due to imperfect detection of salient image features 500 and the potential presence of visual artifacts within the captured frames 400A, 402A.

In some cases, the process of calculating local motion vectors for salient image features 500 may include performing background subtraction on one or more frames 400A, 402A. This may have the effect of removing features 500 in the image that do not appear to move independently from the vehicle 100—e.g., features 500 having image-space movements consistent with the generalized global motion. Background removal may be performed in any suitable way. In one example, the digital video computing system 204 may output a background-subtracted version of the second frame 402A based on a homography matrix calculated as described above. For example, background removal may include subtracting any image content associated with one or more image features 500 identified as inliers during RANSAC analysis, without removing image content associated with image features 500 identified as outliers—e.g., those that exhibit apparent motion that is independent from the motion of the vehicle 100.

Figure 6:
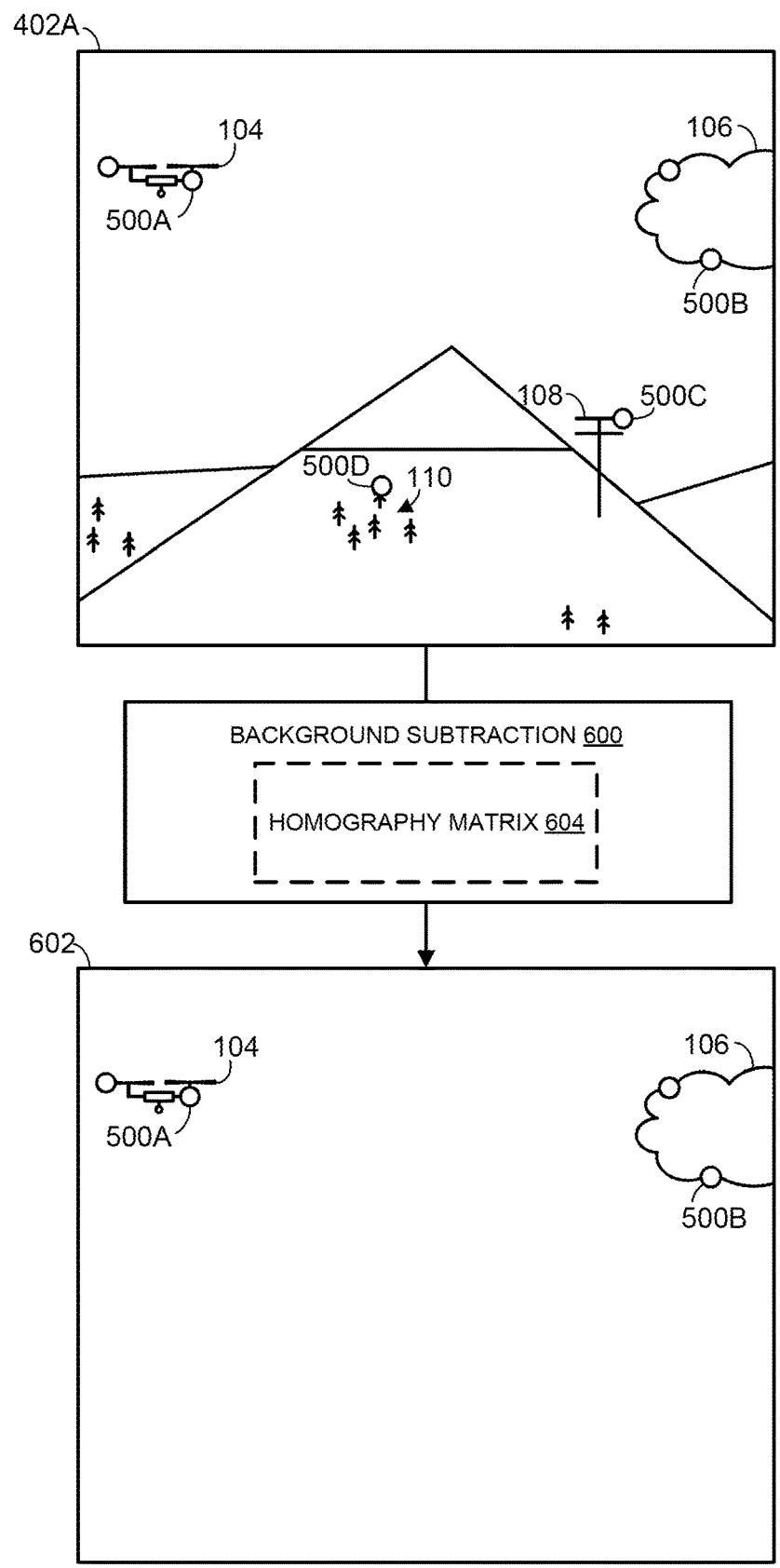
FIG. 6 schematically illustrates outputting a background-subtracted version of a frame of a digital video in accordance with an embodiment of the present disclosure.

Background subtraction is schematically illustrated with respect to FIG. 6. Specifically, FIG. 6 again shows frame 402A, including salient image features 500A-D. In FIG. 6, a background subtraction process 600 is applied to frame 402A to output a background-subtracted version 602 of frame 402A. As shown, second vehicle 104 and cloud 106 are still depicted within the background-subtracted version of the frame, along with their corresponding salient image features 500A and 500B. Background subtraction 600 may in some cases be done on the basis of a homography matrix 604, calculated as described above.

As shown in FIG. 6, ground-based structure 108 and trees 110, along with other static objects in the environment 102, have been removed. This is because such static objects exhibited image-space movement consistent with the generalized global motion calculated as described above, and thus have been removed as background content. In some cases, the process of extracting salient image features 500 may be repeated for the background-subtracted version 602 of the frame 402A. The set of salient image features 500 detected within the background-subtracted version 602 of the frame 402A may be compared to the set of salient image features 500 detected within the original version of the frame 402A, to prune the total set of tracked image features 500 to include only those that have an apparent motion relative to the environment 102.

Background-subtraction 600 may take any suitable form. As one non-limiting example, frames 400A, 402A of the digital video include one or more channels (e.g., a greyscale channel, or a set of color channels). For any pixels determined as corresponding to the background, the digital video computing system 204 may assign such pixels a null value within each channel of the background-subtracted version 602 of the frame 402A. As another example, the digital video computing system 204 may identify a list of pixels that are identified as corresponding to the background, and ignore such pixels for the sake of downstream processing.

In another example, the background-subtracted version 602 of the frame 402A need not preserve any image content from the original frame 402A. Rather, the background-subtracted version 602 of the frame 402A may include a listing of salient image features 500 identified in the frame along with their respective image-space coordinates. In some cases, such a listing of salient image features 500 may omit any image features 500 that do not have an apparent motion relative to the environment 102—e.g., any image features 500 having an observed image-space movement that is consistent with the generalized motion vector.

Figure 7B:
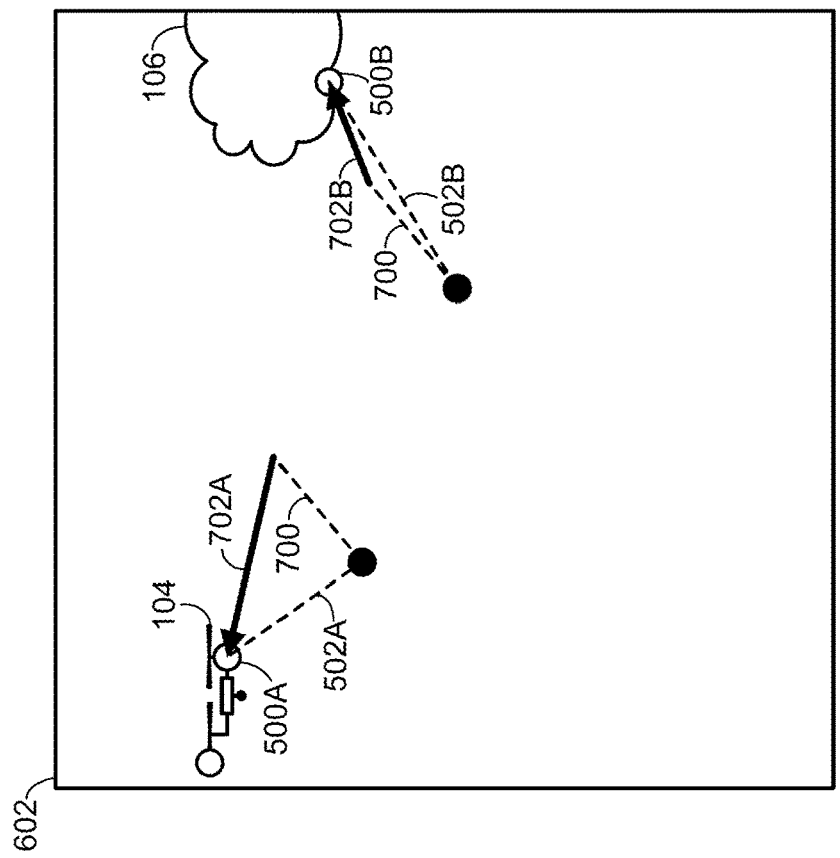
FIGS. 7A and 7B schematically illustrate calculation of a local motion vector for a salient image feature identified in a frame of a digital video in accordance with an embodiment of the present disclosure.
Figure 7A:
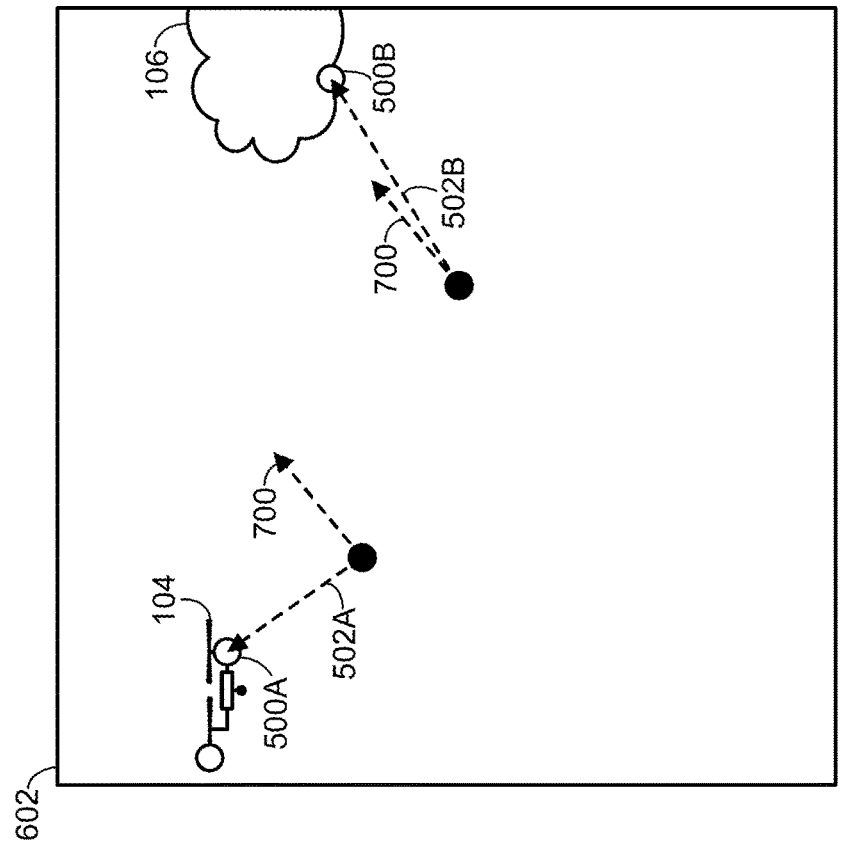

Calculation of local motion vectors for salient image features 500 is schematically illustrated with respect to FIGS. 7A and 7B. Specifically, FIG. 7A again shows background-subtracted frame 602, along with second vehicle 104, cloud 106, and image features 500A and 500B. FIG. 7A also shows the global motion vectors 502A and 502B calculated for image features 500A and 500B. Two generalized global motion vectors 700 are also depicted, each representing the expected image-space movement of the salient image features 500 attributable to motion of the vehicle 100. As discussed above, global motion vectors 502A and 502B are incongruous with vectors 700, which may be an indication that second vehicle 104 and cloud 106 are moving through the environment 102 independently from the vehicle 100.

In this example, local motion vectors were calculated after a background-subtracted version 602 of a frame 402A was output. It will be understood that this need not always be the case. Rather, in some examples, local motion vectors may be calculated without first outputting background-subtracted versions of frames of a digital video.

In some examples, calculating the local motion vector for a salient image feature 500 includes, for each salient image feature 500, comparing the global motion vector 502 of the salient image feature 500 to the generalized global motion 700 calculated for the two or more frames 400A, 402A. This is illustrated with respect to FIG. 7B, again showing background-subtracted frame 602. In this example, a local motion vector 702A is calculated for salient image feature 500A, and a local motion vector 702B is calculated for salient image feature 500B. As shown, each local motion vector 702 reflects a difference between the observed image-space motion of its corresponding salient image feature 500—as denoted by the global motion vector 502 for that feature—and the expected image-space motion of the feature 500 if only the generalized global motion 700 was applied.

In FIG. 7B, local motion vector 702A indicates that salient image feature 500A exhibited an upwards and leftwards movement between capture of frames 400A and 402A that appears to be independent of the motion of the vehicle 100 between capture of the two frames 400A, 402A. Similarly, local motion vector 702B indicates that salient image feature 500B exhibited an upwards and rightwards movement that appears at least partially independent from the movement of the vehicle 100.

Returning briefly to FIG. 3, at 310, method 300 includes determining that the salient image feature 500 has an apparent motion relative to the environment 102 that is independent from the movement of the vehicle 100 between capture of each frame of the two or more frames 400A, 402A. This is done based at least on the local motion vector 702 for the salient image feature 500. For example, the digital video computing system 204 may determine that any salient image features 500 for which non-zero local motion vectors 702 were calculated have apparent motion relative to the environment 102 that is independent from the movement of the vehicle 100.

At 312, method 300 includes identifying a candidate image patch within the two or more frames. The candidate image patch includes at least one salient image feature 500. In some cases, the digital video computing system 204 may identify a plurality of different candidate image patches, each including one or more different salient image features 500. In such cases, the plurality of candidate image patches may include salient image features 500 determined to have an apparent motion relative to the environment 102 that is independent from the movement of the vehicle 100 between capture of each frame of the two or more frames 400A, 402A. As described above, such a determination may be made based at least on the local motion vectors 702 for each of the one or more salient image features 500.

This is schematically illustrated with respect to FIG. 8, again showing frame 402A. In this example, two different candidate image patches 800A and 800B have been identified. Candidate image patch 800A includes salient image feature 500A and other salient image features 500 depicting second vehicle 104. Candidate image patch 800B includes salient image feature 500B and other salient image features 500 depicting cloud 106. No candidate image patches are identified for salient image features 500C or 500D, as features 500C and 500D did not exhibit an image-space movement that appears independent from the motion of the vehicle 100.

The candidate image patches 800 may have any suitable size and may each include any suitable number of selected image features 500. In one example, candidate image patches 800 may have sizes of 40×40 pixels, although other suitable sizes may be used, and each candidate image patch 800 need not have the same size. Candidate image patches 800 can have any suitable shapes, including squares, rectangles, circles, and other shapes, including irregular shapes.

In cases where candidate image patches 800 have different sizes from one another, the size of each candidate image patch 800 can be based at least in part on the inferred distance between the camera system 202 and the objects that the image features 500 correspond to—e.g., based on information from a disparity image frame. In some examples, the sizes of candidate image patches 800 may be set by enclosing one or more salient image features 500, with a minimum buffer region of a predetermined number of pixels separating each salient image feature 500 and the boundary of the candidate image patch 800. In general, each candidate image patch 800 will include at least one salient image feature 500 determined to have an apparent motion independent from the movement of the vehicle 100, although each candidate image patch 800 will beneficially include two or more such features 500 that are proximate to one another, thereby reducing the risk of tracking visual artifacts or false positives.

In some cases, each candidate image 800 patch may include any salient image features 500 having image-space coordinates within a threshold number of pixels of one another, where different candidate image patches 800 are generated for image features 500 that are farther apart than the threshold distance. Any suitable threshold may be used. Furthermore, any suitable number of candidate image 800 patches may be identified for each frame of the digital video.

Figure 8:
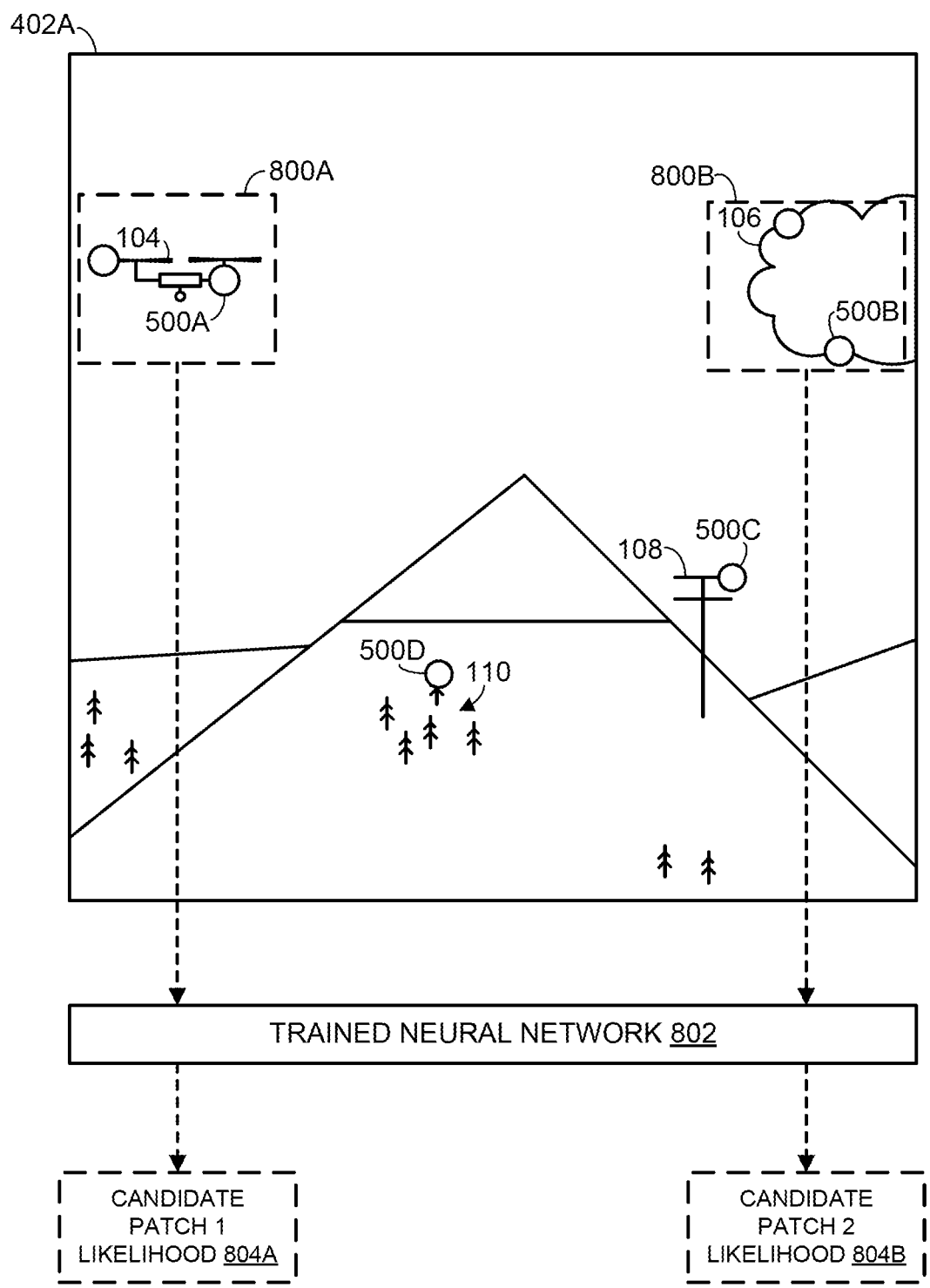
FIG. 8 schematically illustrates identification of a candidate image patch within a frame of a digital video in accordance with an embodiment of the present disclosure.

In the example of FIG. 8, the candidate image patches 800 are identified in frame 402A, rather than background-subtracted frame 602. In other examples, however, candidate image patches 800 may be identified in either or both of an original frame 402A of digital video, and/or a background-subtracted version 602 of the frame 402A. In some cases, each of the one or more candidate image patches 800 may be two-channel images, or have more than two channels. For example, each candidate image patch 800 may include a greyscale channel, one or more color channels, a background-subtracted channel, and/or include other suitable content, such as an estimated depth of an object depicted by one or more pixels.

In some cases, salient image features 500 included within a candidate image patch 800 may include a salient image feature 500 having a cumulative motion differential score that exceeds a threshold. In other words, the digital video computing system 204 may, for any or all of the identified salient image features 500, assign each salient image feature 500 a different motion-differential score on each of the two or more frames 400A, 402A based on a comparison between the local motion vector 702 for the salient image feature 500 and the generalized global motion 700 calculated for the two or more frames 400A, 402A. From there, the candidate image patches 800 may be identified such that they include one or more image features 500 having a motion-differential score that exceeds the threshold. In some cases, all of the salient image features 500 included within each candidate image patch 800 may be features 500 that have motion-differential scores exceeding the threshold.

Put another way, the digital video computing system 204 may evaluate, for one or more salient image features 500, a difference between the observed image-space movement of the image feature 500 and the generalized global motion 700 attributable to motion of the vehicle 100. Relatively greater differences between the observed image-space movement for a given salient image feature 500 and the generalized global motion 700 will result in the salient image feature 500 having a local motion vector 702 with a relatively larger magnitude, and thus may be assigned a relatively larger motion-differential score. By contrast, any features 500 having an image-space movement that is consistent with the generalized global motion 700 may be assigned relatively lower motion-differential scores (e.g., zero). In some cases, motion-differential scores for each image feature 500 may be aggregated from one frame to the next (e.g., by summing or averaging). This takes advantage of the fact that, over time, objects that are actually moving through the environment 102 are likely to be associated with image features 500 that consistently have high motion-differential scores, while false positives are unlikely to exhibit consistent independent movement over time.

Motion-differential scores may be calculated in any suitable way and have any suitable range of values. Furthermore, the threshold for determining whether a particular salient image feature 500 should be selected for inclusion in a candidate image patch 800 may have any suitable value. In some cases, the threshold value may be tuned for each implementation, where higher motion-differential thresholds may result in fewer false positives, though potentially increase the risk of false negatives.

Returning briefly to FIG. 3, at 314, method 300 includes analyzing the candidate image patch 800 to output a likelihood that the candidate image patch 800 depicts a second vehicle 104 moving through the environment 102. In one example, analyzing a candidate image patch 800 may include supplying the candidate image patch 800 to a trained neural network. This is also schematically illustrated with respect to FIG. 8. As shown, candidate image patches 800A and 800B are each supplied to a trained neural network 802, which outputs a likelihood 804A that candidate image patch 800A depicts a second vehicle 104, and a likelihood 804B that candidate image patch 800B depicts a second vehicle 104. In this example, candidate image patch 800A actually does depict second vehicle 104, while candidate image patch 800B depicts a portion of cloud 106. Thus, likelihood 804A will likely be significantly higher than likelihood 804B.

In general, each candidate image patch 800 may be analyzed in any suitable way, in some examples utilizing any suitable artificial intelligence (AI) or machine learning (ML) technologies. Examples of suitable AI and ML technologies are described below with respect to FIG. 10. In one example scenario where a trained neural network 802 is used, the neural network 802 may be a 20-layer deep neural network including residual nodes. The neural network 802 may accept as an input a tensor of shape 40×40×2×N, for a two-channel candidate image patch 800 of size 40×40 pixels including N salient image features 500. In this example, the neural network 802 may process each of the candidate image patches 800 in parallel and produce a final output indicating the likelihood 804 of each candidate patch 800 depicting a second vehicle 104.

Because background-subtracted images may include motion features in addition to appearance features, use of background-subtracted candidate image patches 800 may enable the neural network 802 to generalize to types of motion not included in the neural network's training set. In general, it may be more computationally efficient to supply individual candidate image patches 800 to the trained neural network 802 rather than entire image frames 400A, 402A.

In some cases, after the candidate image patches 800 are analyzed, the digital video system 204 may be configured to identify a highest-likelihood candidate image patch 800A—in other words, the candidate image patch 800 determined to have the highest likelihood 804 of depicting a second vehicle 104. The digital video computing system 204 may then estimate a three-dimensional position of the second vehicle 104 within a coordinate space of the camera system 202 based at least on known parameters of the camera system 202 and an image space position of the second vehicle 104 within the highest-likelihood candidate image patch 800A.

As discussed above, the digital video computing system 204 may receive information regarding the intrinsic and extrinsic parameters of the camera system 202. Based on such parameters, the digital video computing system 204 may calculate a focal length and optical center of the camera system 202.

From there, a range value ("Z") may be triangulated using a disparity between the image-space pixel coordinates of the second vehicle 104 within one frame 402A as compared to a corresponding frame 402B captured by a different imager of the camera system 202 on the same time frame. To reuse the example from above, frame 402A may be captured by a first imager (e.g., a left imager) of the camera system 202, while a second imager (e.g., a right imager) captures a corresponding frame 402B. In other cases, the image-space coordinates of a second vehicle 104 in one frame may be compared to a disparity image frame, output by the camera system 202 as described above, during triangulation of the position of the second vehicle 104. Once the range value Z is calculated, remaining coordinates X and Y may also be determined using similar triangulation procedures, giving an estimated three-dimensional position of the second vehicle 104 within a coordinate space of the camera system 202.

In some examples, the calibration values used in triangulating the range value Z may be dynamic. For instance, when camera system 202 includes multiple imagers, one or more of the imagers may be attached directly to the body of the vehicle 100, rather than rigidly attached together in a single structure. In such cases, inertial measurement units (IMUs) may be attached to each imager, and acceleration values from each IMU may be used in combination with suitable filtering techniques to compute extrinsic parameters for each image frame 400A, 402A.

In some examples, the range value Z may further be filtered by considering an operating region of the camera system 202 (e.g., 2-50 m) and ignoring any range estimates outside this operating region. Furthermore, in some examples, an external sensor (e.g., a radar sensor) may be used in combination with the camera system 202 to remove additional false positives by ignoring any triangulations that are outside of a 3D zone around a target position returned by the external sensor.

It will be understood, however, that the triangulation procedure described above is a non-limiting example. In general, a digital video computing system 204 may use any suitable techniques for estimating the three-dimensional position of a second vehicle 104 detected within a candidate image patch 800.

Furthermore, the estimated three-dimensional position of the second vehicle 104 calculated as described above is relative to a coordinate space of the camera system 202. Thus, in some examples, the digital video computing system 204 may be configured to estimate a three-dimensional position of the second vehicle 104 relative to a body of the vehicle 100 based on a predetermined transformation between the coordinate space of the camera system 202 and a coordinate space of the body of the vehicle 100. For example, the digital video computing system 204 may have information regarding the current position of the camera system 202 relative to the body of the vehicle 100, whether that position is fixed or dynamic (e.g., the camera system 202 may be mounted to a gimbal, or otherwise be moveably coupled to the vehicle body). Based on the known current position of the camera system 202, the digital video computing system 204 may apply a suitable transformation to convert the three-dimensional position of the second vehicle 104 relative to the coordinate space of the camera system 202 to a three-dimensional position relative to the body of the vehicle 100.

After determining the three-dimensional position of the second vehicle 104 relative to the body of the vehicle 100, the digital video computing system 204 may be configured to estimate a three-dimensional position of the second vehicle 104 relative to the environment 102 based on the three-dimensional position of the second vehicle 104 relative to the body of the vehicle 100, and a known position of the vehicle 100 relative to the environment 102. For example, the vehicle 100 may be equipped with one or more sensors or devices useable to determine and track its own position within the environment 102—e.g., a global positioning system (GPS) receiver, magnetometer, and/or IMU including one or more accelerometers and/or gyroscopes. Based on the known position of the vehicle 100 within the environment 102, the digital video computing system 204 may apply a suitable transformation to convert the three-dimensional position of the second vehicle 104 relative to the body of the vehicle 100, to a three-dimensional position relative to the environment 102—e.g., expressed as a set of latitude and longitude coordinates along with an elevation value, or in any other suitable way.

The present disclosure has thus far focused on a scenario in which a three-dimensional position of a second vehicle 104 is estimated based on a single highest-likelihood candidate image patch 800A. In other examples, however, the digital video computing system 204 may output multiple different three-dimensional position estimates for multiple different candidate image patches 800. Additionally, or alternatively, the digital video computing system 204 may refrain from outputting a three-dimensional position estimate on one or more frames of the digital video. For example, on some frames, each of the one or more identified candidate image patches 800 may be determined to have a relatively low likelihood 804 of depicting a second vehicle 104 according to the analysis performed by the digital video computing system 204—e.g., by applying a trained neural network 802. Thus, the digital video computing system 204 may in some cases only output a three-dimensional position estimate for candidate image patches 800 having at least a threshold likelihood 804 of depicting a second vehicle 104.

In some cases, multiple other vehicles may each be present in the environment 102 and depicted in the frames 400A, 402A of the digital video. Thus, in some cases, the digital video computing system 204 may output and continuously update three-dimensional position estimates for any candidate image patches 800 having higher than a threshold likelihood 804 for depicting another vehicle 104. Furthermore, in some examples, the digital video computing system 204 may conserve processing resources by only outputting three-dimensional position estimates for a second vehicle 104 at fixed or changing intervals—e.g., every other frame, or every third frame.

In some examples, the digital video computing system 204 may associate a candidate image patch with a candidate second vehicle track. For instance, each time a candidate image patch 800 is identified, it may either be added to an existing candidate second vehicle track, or added to a newly-created candidate second vehicle track. In an example scenario, the salient image features 500 in each candidate image patch 800 may serve as measurements for a global nearest neighbor Kalman tracking algorithm, configured to associate each measurement with a candidate second vehicle track, where each candidate second vehicle track is associated with a different Kalman filter. In other words, for each frame 400A, 402A, the digital video computing system 204 may first determine any associations between the current frame's measurements and the current set of candidate vehicle tracks. For any measurements that do correspond to existing tracks, the track may be updated if it is within the gate of the track's filter. For any measurements that do not correspond to existing tracks, the digital video computing system 204 may create a new track, and initialize the track's filter with the measurement. It is likely that, over time, any tracks generated for false positives will diverge and be discarded.

Figure 9:
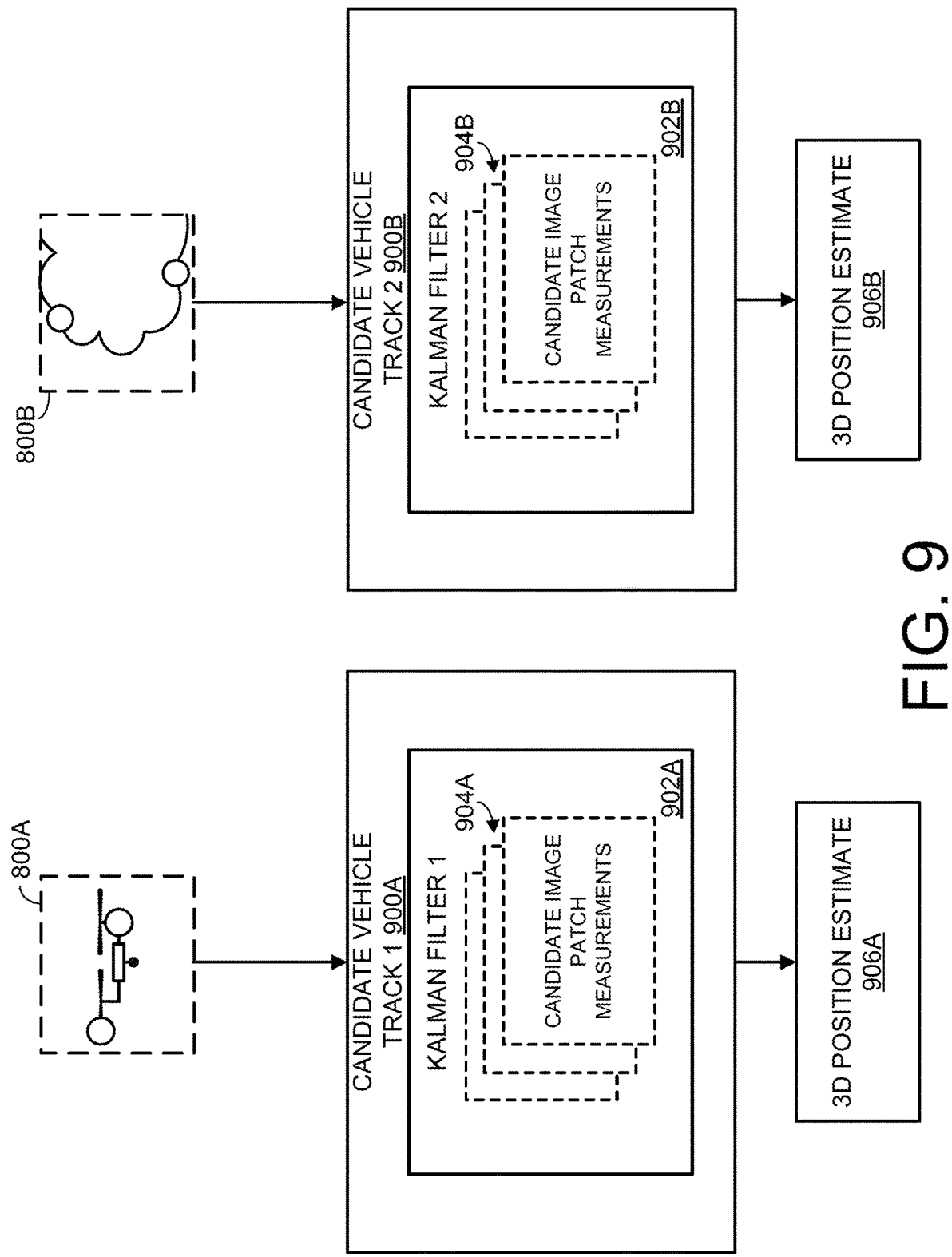
FIG. 9 schematically illustrates estimation of a three-dimensional position of a second vehicle based on a candidate image patch in accordance with an embodiment of the present disclosure.

This process is schematically illustrated with respect to FIG. 9. Specifically, FIG. 9 again shows candidate image patches 800A and 800B, which are respectively associated with different candidate vehicle tracks 900A and 900B. Each candidate vehicle track 900 includes a respective Kalman filter 902A/902B, and each Kalman filter 902 includes measurements 904A/904B extracted from a plurality of prior candidate image patches 800, identified in previous frames of the digital video. In some examples, the Kalman filter 902 may additionally or alternatively include other information useable in estimating the three-dimensional position of a second vehicle 104. For example, the Kalman filter may include a homography matrix 604 calculated as described above, which may be used to account for motion of the vehicle 100 relative to the environment 102.

The digital video computing system 204 may then estimate one or more different three-dimensional positions of the second vehicle 104 based on output from one or more of the Kalman filters 902, associated with different tracks 900. In FIG. 9, the digital video computing system 204 outputs a first three-dimensional position estimate 906A for candidate vehicle track 900A, and a second three-dimensional position estimate 906B for candidate vehicle track 900B. As discussed above, however, the digital video computing system 204 may in some cases only output a single three-dimensional position estimate—e.g., corresponding to the candidate vehicle track 900A associated with the highest-likelihood candidate image patch 800A.

Any suitable process may be used for assigning candidate image patches 800 to different candidate second vehicle tracks 900. In one example, the assignment problem may be formulated as an optimization problem that attempts to maximize the "profits" of a track 900 per measurement 904 and minimize the "price" of a measurement 904 per track 900. To solve this min-max optimization problem, the digital video computing system 204 may formulate a weight association matrix W, which is initialized by the likelihood of a measurement 904 belonging to an existing track 900, or a value that is equal to the probability of assigning a random pixel in the image to a track 900 for the case of creating a new track 900. Operating on W, the digital video computing system 204 may iteratively loop over both measurements 904 and tracks 900, meaning the algorithm can be sensitive to the size of W. In some cases, the digital video computing system 204 may be configured to ensure there is a maximum number of measurements 904 per frame 400A, 402A by reducing the number of salient image features 500 identified in each frame 400A, 402A to a set number of features 500.

Any suitable data may be included in each candidate vehicle track 900. In some examples, a track 900 may be encapsulated by a constant velocity, discrete time Kalman filter 902 operating in the space of pixels. The track's Kalman filter 902 may be updated once a measurement 904 is associated with that track 900, where each measurement 904 includes a position, in pixels, of a salient image feature 500. The track's state may include the position and velocity, in pixels, of the salient image feature 500.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
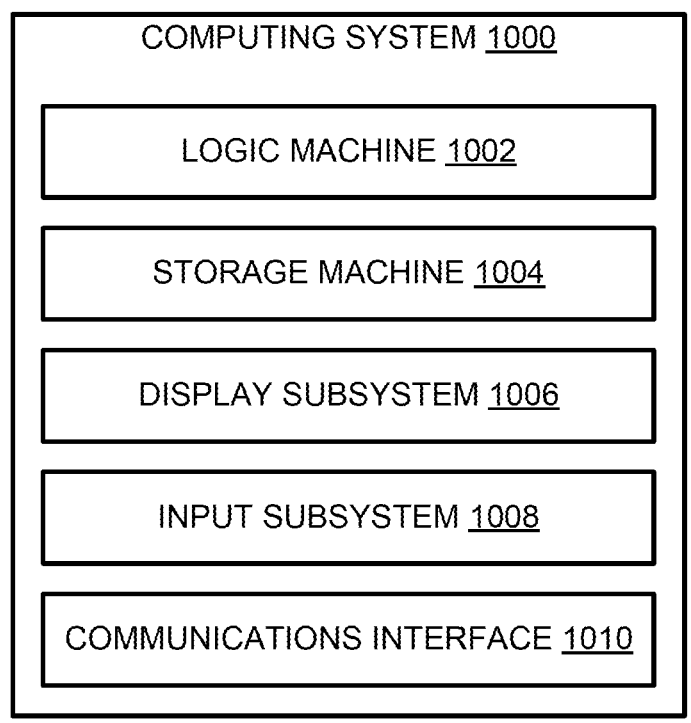
FIG. 10 schematically shows an example computing system in accordance with an embodiment of the present disclosure.

FIG. 10 schematically shows a simplified representation of a computing system 1000 configured to provide any to all of the compute functionality described herein. In particular digital video computing system 204 described above may be implemented as computing system 1000. Computing system 1000 may take the form of one or more digital video computing systems, personal computers, network-accessible server computers, mobile computing devices, mobile communication devices (e.g., smart phone), Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem 1002 may be configured to execute instructions that are part of one or more applications, services, or other logical constructs. The logic subsystem 1002 may include one or more hardware processors configured to execute software instructions. Additionally, or alternatively, the logic subsystem 1002 may include one or more hardware or firmware devices configured to execute hardware or firmware instructions. Processors of the logic subsystem 1002 may be single-core or multi-core, and the instructions executed thereon may be configured for sequential, parallel, and/or distributed processing. Individual components of the logic subsystem 1002 optionally may be distributed among two or more separate devices, which may be remotely located and/or configured for coordinated processing. Aspects of the logic subsystem 1002 may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem 1002. When the storage subsystem 1004 includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem 1002 executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem 1002 and the storage subsystem 1004 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. As discussed above, a trained neural network used to output a likelihood of a candidate image patch depicting a second vehicle may utilize any of the ML or AI techniques described herein.

Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem 1006 may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem 1008 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem 1010 may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a digital video computing system comprises: a logic subsystem; and a storage subsystem holding instructions executable by the logic subsystem to: receive, from a camera system of a vehicle, two or more frames depicting an environment; identify a salient image feature in the two or more frames; calculate a global motion vector indicative of movement of the salient image feature between the two or more frames that is at least partially attributable to a movement of the vehicle between capture of each frame of the two or more frames; calculate a local motion vector indicative of movement of the salient image feature between the two or more frames that is independent from the movement of the vehicle between capture of each frame of the two or more frames; determine that the salient image feature has an apparent motion relative to the environment that is independent from the movement of the vehicle between capture of each frame of the two or more frames, based at least on the local motion vector for the salient image feature; identify a candidate image patch within the two or more frames, the candidate image patch including the salient image feature; and analyze the candidate image patch to output a likelihood that the candidate image patch depicts a second vehicle moving through the environment. In this example or any other example, the instructions are further executable to estimate a three-dimensional position of the second vehicle within a coordinate space of the camera system based at least on known parameters of the camera system and an image space position of the second vehicle within the candidate image patch. In this example or any other example, the instructions are further executable to estimate a three-dimensional position of the second vehicle relative to a body of the vehicle based on a predetermined transformation between the coordinate space of the camera system and a coordinate space of the body of the vehicle. In this example or any other example, the instructions are further executable to estimate a three-dimensional position of the second vehicle relative to the environment based on the three-dimensional position of the second vehicle relative to the body of the vehicle and a known position of the vehicle relative to the environment. In this example or any other example, the camera system is a stereoscopic camera system. In this example or any other example, receiving the two or more frames includes, for each frame, receiving a video frame and a corresponding disparity image frame. In this example or any other example, calculating the global motion vector for the salient image feature includes calculating an optical flow of the salient image feature between the two or more frames. In this example or any other example, the two or more frames include at least a first frame and a second frame, consecutive to the first frame, and wherein the instructions are further executable to calculate a homography matrix between the first frame and the second frame, and based on the homography matrix, output a background-subtracted version of the second frame. In this example or any other example, calculating the local motion vector for the salient image feature includes comparing the global motion vector of the salient image feature to a generalized global motion calculated for the two or more frames. In this example or any other example, the instructions are further executable to assign a motion-differential score to the salient image feature on each of the two or more frames based on a comparison between the local motion vector for the salient image feature and a generalized global motion calculated for the two or more frames. In this example or any other example, the salient image feature has a cumulative motion-differential score exceeding a threshold. In this example or any other example, the candidate image patch is a two-channel image including a greyscale channel and a background-subtracted channel. In this example or any other example, the instructions are further executable to associate the candidate image patch with a candidate second vehicle track. In this example or any other example, the instructions are further executable to estimate a three-dimensional position of the second vehicle based on output from a Kalman filter associated with the candidate second vehicle track. In this example or any other example, the vehicle is an unmanned aerial vehicle (UAV).

In an example, a method comprises: receiving two or more frames depicting an environment from a camera system of a vehicle; identifying a salient image feature in the two or more frames; calculating a global motion vector indicative of movement of the salient image feature between the two or more frames that is at least partially attributable to a movement of the vehicle between capture of each frame of the two or more frames; calculating a local motion vector indicative of movement of the salient image feature between the two or more frames that is independent from the movement of the vehicle between capture of each frame of the two or more frames; determining that the salient image feature has an apparent motion relative to the environment that is independent from the movement of the vehicle between capture of each frame of the two or more frames, based at least on the local motion vector for the salient image feature; identifying a candidate image patch within the two or more frames, the candidate image patch including the salient image feature; and analyzing the candidate image patch to output a likelihood that the candidate image patch depicts a second vehicle moving through the environment. In this example or any other example, the method further comprises estimating a three-dimensional position of the second vehicle within a coordinate space of the camera system based at least on known parameters of the camera system and an image space position of the second vehicle within the candidate image patch. In this example or any other example, the camera system is a stereoscopic camera system. In this example or any other example, the vehicle is an unmanned aerial vehicle (UAV).

In an example, a vehicle comprises: a camera system configured to capture two or more frames depicting an environment; and a digital video computing system configured to: receive the two or more frames from the camera system; identify a salient image feature in the two or more frames; calculate a global motion vector indicative of movement of the salient image feature between the two or more frames that is at least partially attributable to a movement of the vehicle between capture of each frame of the two or more frames; calculate a local motion vector indicative of movement of the salient image feature between the two or more frames that is independent from the movement of the vehicle between capture of each frame of the two or more frames; determine that the salient image feature has an apparent motion relative to the environment that is independent from the movement of the vehicle between capture of each frame of the two or more frames, based at least on the local motion vector for the salient image feature; identify a candidate image patch within the two or more frames, the candidate image patch including the salient image feature; and analyze the candidate image patch to output a likelihood that the candidate image patch depicts a second vehicle moving through the environment.

The invention claimed is:

1. A digital video computing system, comprising:
a logic subsystem; and
a storage subsystem holding instructions executable by the logic subsystem to:
receive, from a camera system of a vehicle, two or more frames depicting an environment;
identify a salient image feature in the two or more frames;
calculate a global motion vector indicative of movement of the salient image feature between the two or more frames that is at least partially attributable to a movement of the vehicle between capture of each frame of the two or more frames;
calculate a local motion vector indicative of movement of the salient image feature between the two or more frames that is independent from the movement of the vehicle between capture of each frame of the two or more frames;
determine that the salient image feature has an apparent motion relative to the environment that is independent from the movement of the vehicle between capture of each frame of the two or more frames, based at least on the local motion vector for the salient image feature;
identify a candidate image patch within the two or more frames, the candidate image patch including the salient image feature, wherein the candidate image patch is a two-channel image including a greyscale channel and a background-subtracted channel, such that the candidate image patch includes a first plurality of pixel values corresponding to the greyscale channel and a second plurality of pixel values corresponding to the background-subtracted channel; and
analyze the candidate image patch to output a likelihood that the candidate image patch depicts a second vehicle moving through the environment.

2. The digital video computing system of claim 1, wherein the instructions are further executable to estimate a three-dimensional position of the second vehicle within a coordinate space of the camera system based at least on known parameters of the camera system and an image space position of the second vehicle within the candidate image patch.

3. The digital video computing system of claim 2, wherein the instructions are further executable to estimate a three-dimensional position of the second vehicle relative to a body of the vehicle based on a predetermined transformation between the coordinate space of the camera system and a coordinate space of the body of the vehicle.

4. The digital video computing system of claim 3, wherein the instructions are further executable to estimate a three-dimensional position of the second vehicle relative to the environment based on the three-dimensional position of the second vehicle relative to the body of the vehicle and a known position of the vehicle relative to the environment.

5. The digital video computing system of claim 1, wherein the camera system is a stereoscopic camera system.

6. The digital video computing system of claim 5, wherein receiving the two or more frames includes, for each frame, receiving a video frame and a corresponding disparity image frame.

7. The digital video computing system of claim 1, wherein calculating the global motion vector for the salient image feature includes calculating an optical flow of the salient image feature between the two or more frames.

8. The digital video computing system of claim 7, wherein the two or more frames include at least a first frame and a second frame, consecutive to the first frame, and wherein the instructions are further executable to calculate a homography matrix between the first frame and the second frame, and based on the homography matrix, output a background-subtracted version of the second frame.

9. The digital video computing system of claim 8, wherein calculating the local motion vector for the salient image feature includes comparing the global motion vector of the salient image feature to a generalized global motion calculated for the two or more frames.

10. The digital video computing system of claim 1, wherein the instructions are further executable to assign a motion-differential score to the salient image feature on each of the two or more frames based on a comparison between the local motion vector for the salient image feature and a generalized global motion calculated for the two or more frames.

11. The digital video computing system of claim 10, wherein the salient image feature has a cumulative motion-differential score exceeding a threshold.

12. The digital video computing system of claim 1, wherein the instructions are further executable to associate the candidate image patch with a candidate second vehicle track.

13. The digital video computing system of claim 12, wherein the instructions are further executable to estimate a three-dimensional position of the second vehicle based on output from a Kalman filter associated with the candidate second vehicle track.

14. The digital video computing system of claim 1, wherein the vehicle is an unmanned aerial vehicle (UAV).

15. The digital video computing system of claim 1, further comprising calculating a focal length and optical center of the camera system based on intrinsic and extrinsic parameters of the camera system.

16. A method comprising:
receiving two or more frames depicting an environment from a camera system of a vehicle;
identifying a salient image feature in the two or more frames;
calculating a global motion vector indicative of movement of the salient image feature between the two or more frames that is at least partially attributable to a movement of the vehicle between capture of each frame of the two or more frames;
calculating a local motion vector indicative of movement of the salient image feature between the two or more frames that is independent from the movement of the vehicle between capture of each frame of the two or more frames;
determining that the salient image feature has an apparent motion relative to the environment that is independent from the movement of the vehicle between capture of each frame of the two or more frames, based at least on the local motion vector for the salient image feature;
identifying a candidate image patch within the two or more frames, the candidate image patch including the salient image feature, wherein the candidate image patch is a two-channel image including a greyscale channel and a background-subtracted channel, such that the candidate image patch includes a first plurality of pixel values corresponding to the greyscale channel and a second plurality of pixel values corresponding to the background-subtracted channel; and
analyzing the candidate image patch to output a likelihood that the candidate image patch depicts a second vehicle moving through the environment.

17. The method of claim 16, further comprising estimating a three-dimensional position of the second vehicle within a coordinate space of the camera system based at least on known parameters of the camera system and an image space position of the second vehicle within the candidate image patch.

18. The method of claim 16, wherein the camera system is a stereoscopic camera system.

19. The method of claim 16, wherein the vehicle is an unmanned aerial vehicle (UAV).

20. A vehicle, comprising:
a camera system configured to capture two or more frames depicting an environment; and
a digital video computing system configured to:
receive the two or more frames from the camera system;
identify a salient image feature in the two or more frames;
calculate a global motion vector indicative of movement of the salient image feature between the two or more frames that is at least partially attributable to a movement of the vehicle between capture of each frame of the two or more frames;
calculate a local motion vector indicative of movement of the salient image feature between the two or more frames that is independent from the movement of the vehicle between capture of each frame of the two or more frames;
determine that the salient image feature has an apparent motion relative to the environment that is independent from the movement of the vehicle between capture of each frame of the two or more frames, based at least on the local motion vector for the salient image feature;
identify a candidate image patch within the two or more frames, the candidate image patch including the salient image feature, wherein the candidate image patch is a two-channel image including a greyscale channel and a background-subtracted channel, such that the candidate image patch includes a first plurality of pixel values corresponding to the greyscale channel and a second plurality of pixel values corresponding to the background-subtracted channel; and
analyze the candidate image patch to output a likelihood that the candidate image patch depicts a second vehicle moving through the environment.

* * * * *